United States Patent
Yoshimoto et al.

[11] Patent Number: 5,862,409
[45] Date of Patent: Jan. 19, 1999

[54] BUFFER CAPACITY CHANGE MONITORING METHOD AND APPARATUS

[75] Inventors: Yasuo Yoshimoto; Hiroki Sumida, both of Kawasaki, Japan

[73] Assignee: Fujitsu Limited, Kawasaki, Japan

[21] Appl. No.: 580,021

[22] Filed: Dec. 20, 1995

[30]     Foreign Application Priority Data

Dec. 20, 1994   [JP]   Japan .................................. 6-316420

[51] Int. Cl.$^6$ ................................................ G06F 11/32
[52] U.S. Cl. ........................................... 395/877; 711/100
[58] Field of Search ................................... 395/800, 876, 395/877; 711/100

[56]     References Cited

U.S. PATENT DOCUMENTS

| | | | |
|---|---|---|---|
| 5,208,681 | 5/1993 | Yoshida | 358/404 |
| 5,365,552 | 11/1994 | Astle | 375/106 |
| 5,390,299 | 2/1995 | Rege | 395/250 |
| 5,473,756 | 12/1995 | Traylor | 395/250 |
| 5,535,369 | 7/1996 | Wells | 395/497.02 |
| 5,537,552 | 7/1996 | Ogasawara | 395/250 |
| 5,561,823 | 10/1996 | Anderson | 395/877 |
| 5,619,656 | 4/1997 | Graf | 395/200.11 |
| 5,696,701 | 12/1997 | Burgess | 364/551.01 |

*Primary Examiner*—Eric Coleman
*Attorney, Agent, or Firm*—Staas & Halsey

[57]     ABSTRACT

During monitoring of a buffer configured so that expansion of an extent c of a buffer capacity takes place when the size of an unused region is reduced to a required expansion threshold value b, execution of a required calculation using an expansion threshold value b and buffer capacity extent c and c' (where c' is an initial value) for each point of time occurs. The reference values s1 and s2 corresponding to buffer capacities c and c' for each time point are determined and those reference values are used as the basis for screen display of expansion changes to the extent of the buffer capacity, thereby ensuring that a content of a display occurs corresponding to expansion for the extent of a buffer capacity. In addition, the use of the calculation formula for reference value s1 or s2 can be selected, while it is also possible to use a reference value (a fixed value) which has been defined by the user.

21 Claims, 19 Drawing Sheets

FIG. 11

FORMAT OF API INFORMATION

| CURRENT BUFFER USAGE AMOUNT | BUFFER CAPACITY EXTENT CURRENT VALUE | BUFFER CAPACITY EXTENT INITIAL VALUE | EXPANSION THRESHOLD VALUE | EXPANSION CURRENT VALUE | EXPANSION LIMIT VALUE | EXPANSION VALUE | EXPANSION CUMULATIVE VALUE |
|---|---|---|---|---|---|---|---|
| 231 | 232 | 233 | 234 | 235 | 236 | 237 | 238 |

23

BUFFER CAPACITY CHANGE MONITORING METHOD AND APPARATUS

BACKGROUND OF THE INVENTION

The present invention relates to a buffer capacity change monitoring method and a buffer capacity change monitoring apparatus, and in particular, relates to a buffer capacity change monitoring method and apparatus configured so that the extent of the buffer capacity is expanded when the size of an unused region is reduced to a predetermined threshold value.

Moreover, the term "buffer" used in this specification, refers to a memory of a file or some other resource provided with a function for holding data and which has the extent of its capacity within a predetermined range.

The present invention monitors the extent of the buffer capacity and displays a message to that effect on the screen, thereby responding to the need of the system operator or user to know when the extent of the capacity has been expanded.

In the past, a fixed numerical value has been used as a reference value in monitoring expansion of the extent of the buffer capacity. A numerical value such as 70% mentioned below, was defined by the user and used with this fixed reference value. A change in the ratio of buffer usage with time is displayed on a screen. Moreover, in this case, the displayed reference value was the buffer usage ratio at the time when the initial expansion of the buffer extent took place.

FIG. 1 shows the conventional situation prior to the expansion of the extent of a buffer capacity, and FIG. 2 shows the situation after expansion of the extent of the capacity of that buffer. FIG. 1 and FIG. 2, respectively, show the extent of the buffer capacity prior to expansion 100 and after expansion 140. Moreover, formats such as 100 used in this specification express absolute values.

The data which are set beforehand in the status prior to expansion include the following:

The expansion threshold value "b" which indicates the size of the unused region when the expansion takes place;

The reference value "s" which indicates the proportion of the size of the region used to the extent of the buffer capacity, at the time when the expansion takes place; and The amount by which the region is to be expanded when expansion takes place.

Moreover, how many times expansion of the extent of the buffer is to be allowed is determined beforehand for each file and memory, and an expanded portion of a buffer is returned when a usable region is freed in a buffer which has been expanded.

FIG. 1 and FIG. 2 show an example where the expansion threshold value "b" and the expansion size are respectively set as the values of 30 and 40, and where the reference value "s" is calculated as 70% from the initial value of 100 for the expansion threshold value 30 and the extent of the capacity.

In addition, the buffer usage ratio and other information at each reference line 21 for the reference value of 70% are displayed on the monitor screen. When the usable region increases and the buffer usage ratio has reached the reference line 21 of 70%. That is to say, when the size of the unused region has reduced to the expansion threshold value "b" of 30, the extent of the capacity is expanded and there is an alarm notifying that expansion is taking place.

The size of the extent of the buffer capacity increases from the level 100, until it reaches 140, and at the next line 22 where expansion takes place, the expansion threshold value of 140 is reduced by 30 to become 110.

However, the reference value stays at the numerical value of 70% and the number 98 corresponding to 70% is displayed on the reference line 21' of the monitor used by the system operator or user.

When there is an increase in the usable region in the buffer, an alarm is given when there is usage of the portion 98, beneath the line 22 where the second expansion will take place.

After this, when the size of the buffer usage region approaches the portion 110 corresponding to the expansion line 22, expansion takes place so that the extent of the buffer capacity is changed from 140 to 180 but there is no notification to the effect that this expansion has taken place.

In a conventional buffer monitoring apparatus, the reference value set beforehand remains displayed as a percentage, in that there is always a linear display in the direction of the x-axis of the monitor. When there is expansion of the extent of the buffer capacity, the portion of intersection of this display line and the buffer usage ratio are correctly displayed when the first expansion takes place, with erroneous display being performed for when later expansions take place. This creates the problem that the system operator or user cannot correctly recognize expansion of the extent of the buffer capacity. The following is a description in terms of a time series, of conventional buffer monitoring.

FIG. 3 is a view showing conventional buffer monitoring in terms of a time series. The following conditions are used as the basis for a description of a specific example of a series of displays corresponding to the transition of statuses at the various times indicated in FIG. 3. In the figure, the shaded portion indicates the amount of the buffer capacity used.

The initial value for the extent of buffer capacity is 800 KB:

The expansion threshold quantity is 100 KB:

The size of one expansion is 200 KB:

The reference value is $$(800-100)/800 * 100 = 87.5\%$$

At the time t in FIG. 3, the amount used out of the buffer extent of 800 KB is 400 KB. This is shown as the line ① in the graph in FIG. 4. Next, at the time 2t in FIG. 3, the amount used becomes 750 KB and expansion of the buffer takes place so that the buffer status changes from that shown in FIG. 3 to that shown in FIG. 4. The graph of FIG. 4 then has ① plotted as $$400/800 = 50\%$$

which is the information at time it, and ② plotted as $$750/800 = 93.7\%$$

which is the information at time 2t. At time 2t, the reference value of 87.5% is exceeded and so the buffer is expanded to 1000 KB. ③ is then plotted as $$750/1000 = 75\%$$

for time 3t. Buffer capacity expansion thus takes place when the usage ratio has risen.

When there is transformation from the status at time 3t to the status at time 4t, the usage ratio is the same and so there is no change to the plotted height, and only the portion for the time is plotted (③-④). The next occasion when the extent of the buffer capacity will be expanded will be ⑤, and will be as follows.

$$(1000-100)/1000 * 100 = 90\%$$

When there is transformation from the status at time 4t to the status at time 5t, the usage ratio has increased from 750 KB to 880 KB and so $$880/1000 * 100 = 88.8\%$$

is plotted. The extent of the buffer capacity is thus expanded in this manner until a predetermined critical quantity is reached, for each time the usage ratio is increased so that it exceeds the reference value.

However, there are the following problems involved with a display method having a fixed reference value as in the case described above.

First of all, the plot was above the reference value at the time 2t so that the status when the extent of the buffer capacity was expanded could be described. However, the time required to change between the status at time 2t and at time 3t of FIG. 3 is much shorter than the sampling interval t, and there are many instances where is could be either of the situation of the two graphs shown in FIG. 5. This is to say that the system operator cannot know by reading the graph, whether or not expansion actually occurred at time 2t, creating the problem that the expansion may pass unnoticed.

In addition, when there is an increase in the used capacity and ⑤ is plotted, this can be read as indicating that expansion has actually taken place when the second expansion has not taken place. Accordingly, the person who was operating the system when the initial expansion took place may be slow to detect whatever trouble there is, and an operator who manages a system until the critical point for expansion takes place (while allowing for a certain degree of expansion) may come to the conclusion that there is some trouble even though there may still be a surplus capacity.

The following three methods have been disclosed as a solution to these problems but each of them involves its own problems.

The first method is a method which plots buffer management events on the horizontal axis of a graph. (These events are each data storage to the buffer and each are expansion or reduction of the extent of buffer capacity.) However, with this method, the graph and the status of the buffer are always in perfect agreement but each item is not displayed on the horizontal axis and so it is not possible to make a correspondence with other phenomena, and it is not possible to investigate the cause of changes in the extent of the buffer capacity. In addition, there is also a problem in that it is not possible to make a correspondence between the situation for the load on the system and the actual capacity of the buffer.

The second method is a method which stores the status shown in FIG. 3 in terms of time on a horizontal axis. (In this method, there is sampling of peak values and these peak values are written as current values at the time when the extent of the buffer has been reduced.) Since only changes in the extent of the buffer capacity are displayed, it is not possible to determine the current situation for buffer use. Therefore, this method cannot be said to monitor the situation for buffer use.

The third method is a method which displays an absolute value instead of a usage ratio on the vertical axis of a graph. However, with this method, there is no set scale for the vertical axis. If expansion is repeatedly taking place, it no longer becomes possible to display data which exceeds the scale of the vertical axis (and the graph reaches the top of the screen). Furthermore, even if the scale of the vertical axis can be freely changed (where for example, the current size of the extent of the buffer is scaled so that the maximum value is a scale within the screen), scrolling of the graph causes the scale of the vertical axis to change. The graph becomes extremely difficult to read, and increasing the complexity of control. In addition, if there is a logarithmic graph, the frequency at which the scale changes becomes lower but it is difficult to read changes up and down since the amount used does not change logarithmically.

As can be seen, it is therefore best if the situation for the usage of the buffer is displayed in terms of the usage ratio. In each of the conventional methods, it is not possible to have correct and effective system management when there are changes to the extent of the buffer capacity.

SUMMARY OF THE INVENTION

Accordingly, a general object of the present invention is to raise the level of the monitoring function when the extent of the capacity of the buffer is expanded, by using a required calculation using an expansion threshold value and the extent of the buffer capacity for each arbitrary point in time, to determine a reference value corresponding to the extent of the buffer capacity at those points in time, and to show this on the screen of the monitor, thereby having the display on the monitor always being in agreement when even second and later expansions take place.

Another object of the present invention is to provide a buffer monitoring apparatus which displays the amount of change in the extent of buffer capacity, thereby enabling an operator to immediately recognize those change.

Furthermore another object of the present invention is to display expansion of the buffer in such a manner that the operator can immediately recognize that expansion of the buffer has taken place.

Furthermore, another object of the present invention is to output a sound when a buffer usage amount exceeds a reference value, thereby enabling an operator to immediately recognize such situations.

There objects can be achieved by a buffer monitoring method configured so that expansion of an extent of buffer capacity takes place when a size of an unused region of a buffer is reduced to a required expansion threshold value, the execution of a required calculation uses the expansion threshold value and the extent of the buffer capacity for each arbitrary point of time, determines a reference value corresponding to the extent of the buffer capacity for each point of time, and uses the reference value as the basis to display expansion taking place for the extent of the buffer capacity, so that the correspondence between the content of a display and the occurrence of the expansion can be recognized.

Still another specific object of the present invention is to provide a buffer monitoring method which uses $$s1 = (c'-b)/c \qquad (1)$$

where
   s1 reference value
   c' initial value of extent of buffer capacity b expansion threshold value c extent of buffer capacity as the calculation for determining a reference value.

Still another specific object of the present invention is to provide a buffer monitoring method which uses $$s2=(c-b)/c \quad (2)$$

where s1 reference value b expansion threshold value c extent of buffer capacity as the calculation for determining a reference value.

Still another object of the present invention can be achieved by a buffer monitoring apparatus configured so that expansion of an extent of a buffer capacity takes place when a size of an unused region of a buffer is reduced to a required expansion threshold value, the apparatus being provided with a reference value calculation function which executes a required calculation using the expansion threshold value and the extent of the buffer capacity for each arbitrary point of time, to determine a reference value corresponding to the extent of the buffer capacity for each point of time, and a display function which uses the reference value as the basis to display expansion taking place for the extent of the buffer capacity, thereby enabling the correspondence between the display content on a display function and the occurrence of the expansion to be recognized.

In this manner, the present invention makes the reference value a value calculated on the basis of the extent of the buffer capacity at each arbitrary point in time, instead of being a fixed value as is conventionally the case, and ensures agreement between expansion of the extent of the buffer capacity and the display of the reference value to be maintained.

FIG. 6 shows the display screen for when s1 is calculated by formula (1) as the reference value, and expansion of the extent of the buffer capacity takes place four times from the number of changes in the solid line portion which indicates the reference value s1, and the graph also shows that the reference value is lowered to where "s1=45%".

Moreover, the solid line portion indicates the reference value s1 successively decreases in a step pattern along with each increase of the extent of the buffer capacity of the increase in the value for the denominator since the numerator (c'−b) in formula (1) is fixed.

The solid line portion which indicates the reference value s1 and the dotted line portion which indicates the buffer usage ratio intersect at the portion where the first expansion takes place, with the line for the buffer usage ratio being above the line for the reference value s1 after that.

Then, the solid line portion below which the reference value s1 does not move when expansion takes place for the predetermined number of times, remains parallel to the x-axis, and the user can note any increase in the buffer usage ratio from this display and also from any new alarm which is given after that.

In addition, when s2 calculated from formula (2) is used as the reference value, the display screen changes as shown in FIG. 7, and from the number of times the solid line portion changes which indicates the reference value s2, it can be seen that expansion of the buffer capacity has taken place two times, and that the extent of the buffer capacity is still above the reference value until the status where s2=88%.

Moreover, the solid line portion decreases indicates the reference value s1 successively in a step pattern along with each increase of the extent of the buffer capacity because of the increase in the value for the denominator c since b (the value for the expansion threshold value) in the numerator (1−b/c) in formula (2) is fixed.

In the case of formula (2) being used, there is the relationship where the next expansion takes place when the buffer usage ratio increases to attain the reference value s2 and so the dotted line indicates the buffer usage ratio does not go over the solid line portion which indicates the reference value s2, and the buffer usage ratio changes within a range less than the reference value s2.

When expansion has occurred for the predetermined number of times, the solid line portion which does not exceed the reference value remains parallel to the x-axis but the two will intersect should the buffer usage ratio increases any more.

When the line do intersect, then in the same manner as for when reference value s1 is used, the display screen and any new alarm given will alert the user to that increase in the buffer usage ratio.

In addition, the period of time in the direction of the x-axis on each of the display screen shown in FIG. 6 and FIG. 7 is 60 minutes, while the data which shows the extent of the buffer capacity is renewed every 15 seconds, with the reference values s1 and s2 also being renewed and display updated over this time period.

BRIEF DESCRIPTION OF THE DRAWINGS

FIG. 11 is a view showing the configuration of an API information storage portion according to a first embodiment according to the present invention.

DESCRIPTION OF THE INVENTION

The following is a detailed description of an embodiment of the present invention, with reference to the appended drawings.

The first part of the description is for the outline of the buffer monitoring apparatus according to the present invention.

Figure 8:
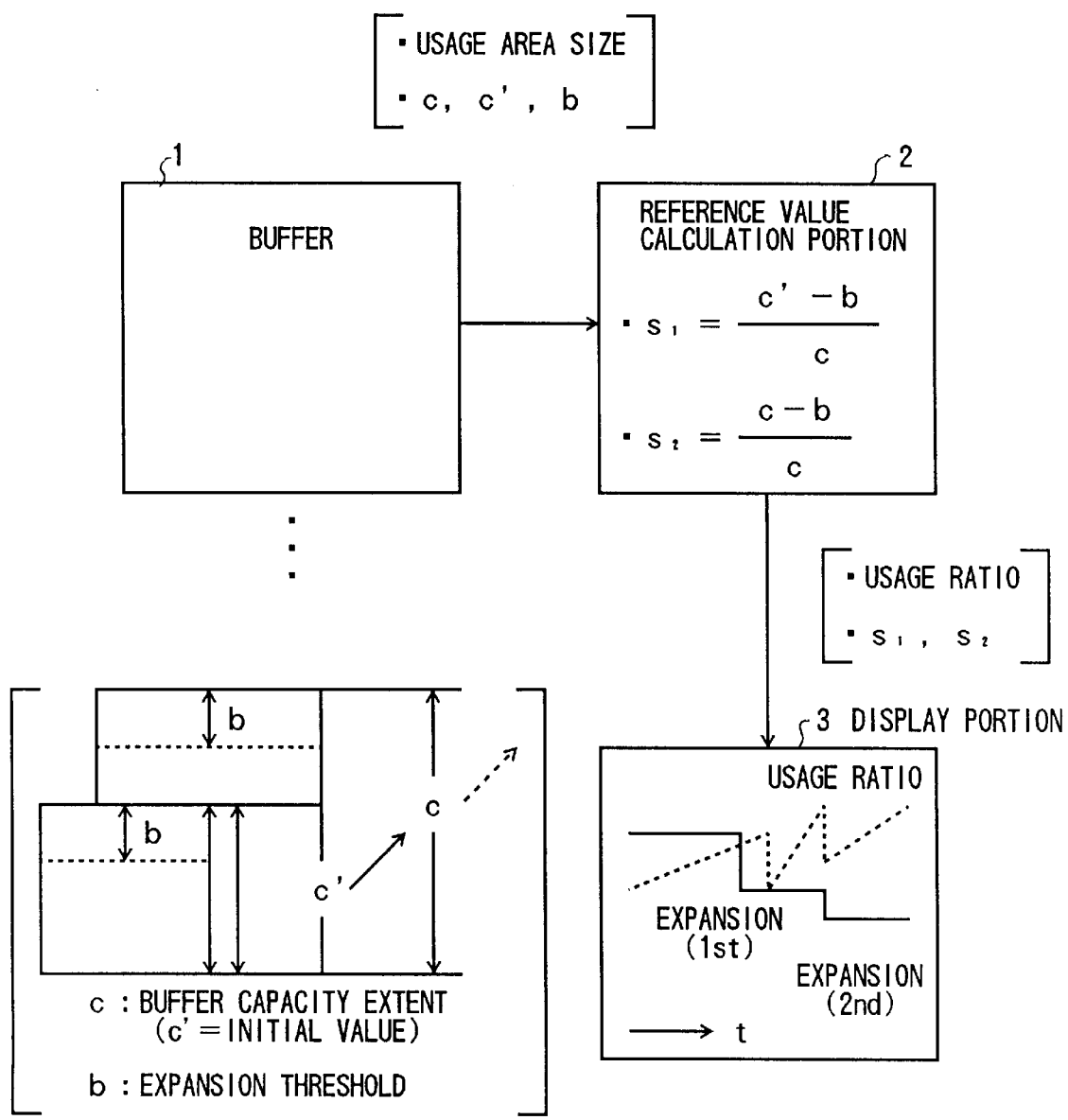
FIG. 8 is a view showing the basic configuration of the present invention.

The buffer monitoring apparatus shown in FIG. 8 is configured from a buffer 1, a reference value calculation portion 2 and a display portion 3.

The buffer 1 is the source for memories and files and the like configured so that expansions automatically take place when a size of an unused region is reduced to a predetermined threshold value b (fixed value).

The reference value calculation portion 2 determines the used region, c, and the extent c' of the buffer capacity for an arbitrary time interval (such as 15 seconds for example), and executes a required calculation to calculate the reference value s1, s2 for the buffer 1.

The display portion 3 displays the usage ratio and the reference value s1, s2. Moreover, the display pattern at this time can be for processing the reference value s1, s2 within a range so that an expansion taking place will be recognized.

Here, the reference value calculation portion 2 uses the following formula with the expansion threshold value b, and the buffer capacity extent c' and c (where c' is an initial value), when the reference value s of buffer 1 is calculated.

$$s1 = (c'-b)/c \tag{1}$$

In addition, the reference value calculation portion 2 uses the following formula with the expansion threshold value b and the buffer capacity extent c when the reference value s2 of the buffer 1 is calculated.

$$s2 = (c-b)/c \tag{2}$$

There reference values s1, s2 are generally used selectively but both can be used together, or the calculation processing for the reference values s1, s2 can be for only when the buffer capacity extent c taken for the buffer 1 is different from the former value.

For example, when the reference value s2 is used, the reference value calculation portion 2 performs a calculation using the new buffer extent capacity c after expansion has taken place. By doing this, the value of the reference value s1 becomes smaller than it has been until then and so the display portion 3 displays another step of a stepped outline each time the extent of the buffer capacity is expanded.

Figure 9:
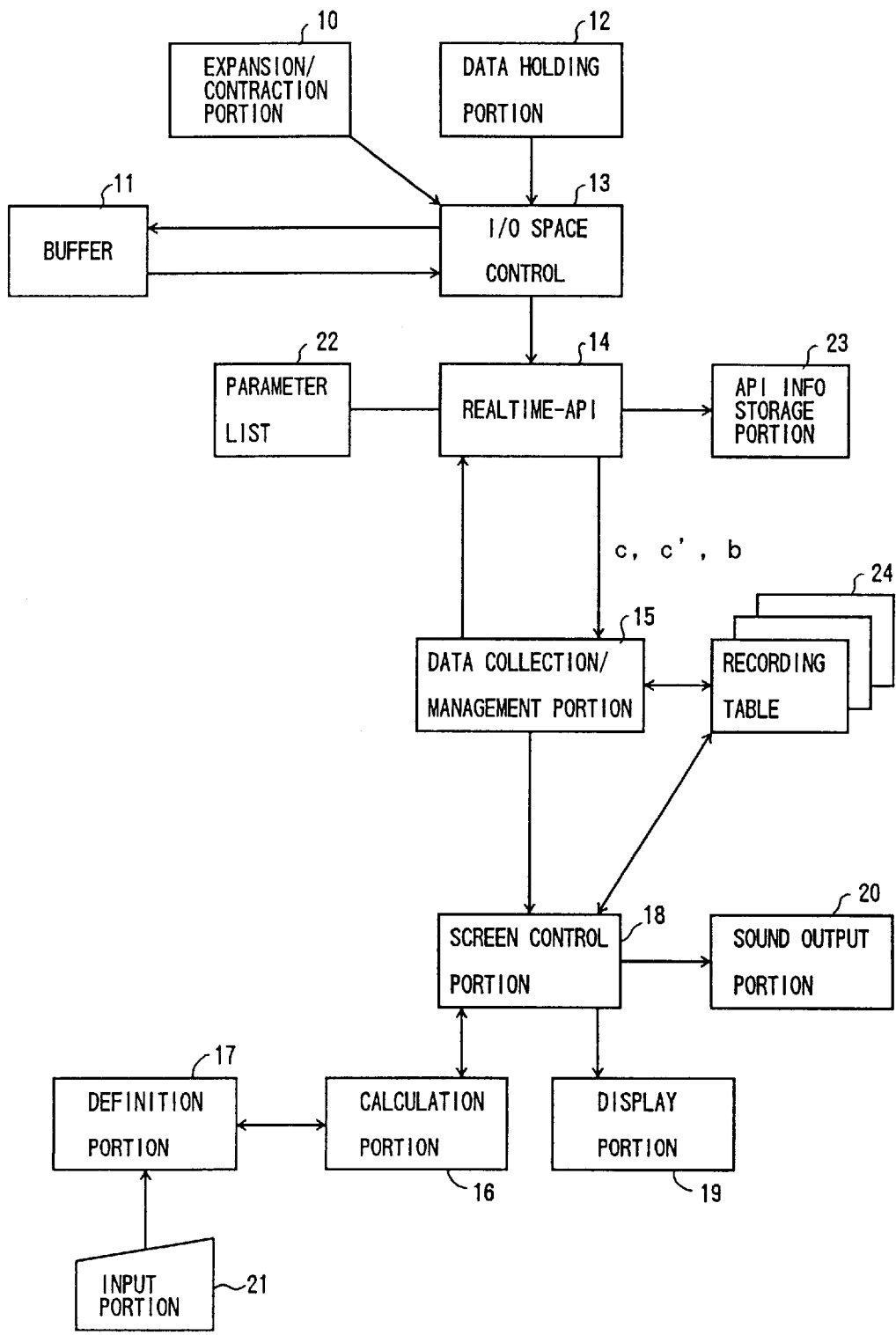
FIG. 9 is a view showing an outline of a buffer monitoring apparatus of a first embodiment according to the present invention.

FIG. 9 is a view showing an outline of a buffer monitoring apparatus according to a first embodiment of the present invention, and the buffer monitoring apparatus according to the present invention is configured from a capacity extent expansion/contraction portion 10, a buffer 11, a data holding portion 12, an I/O space controller 13, a real-time API 14, a data collection/management portion 15, a calculation portion 16, a definition portion 17, a screen controller 18, a display portion 19, a sound output portion 20, an input portion 21, a parameter list 22, an API information storage portion 23 and a recording table 24.

The capacity extent expansion/contraction portion 10 calculates the capacity necessary for a program or the like which is executed by the user, and the capacity of the buffer 11 is expanded if it is judged that the existing capacity extent is insufficient, or the capacity of the buffer 11 is made smaller if it is judged that the existing capacity is larger than required for the processing.

The buffer 11 is automatically expanded by the capacity extent expansion/contraction portion 10.

The data holding portion 12 holds required values such as the usage limit value and the expansion threshold value b.

The I/O space controller 13 indicates automatic expansion of the extent of the buffer capacity, and receives data from the data holding portion 12 and also data from the buffer 11 for the buffer usage amount and the extent c and c' of the buffer capacity at each required cycle (such as 15 seconds for example).

Figure 10:
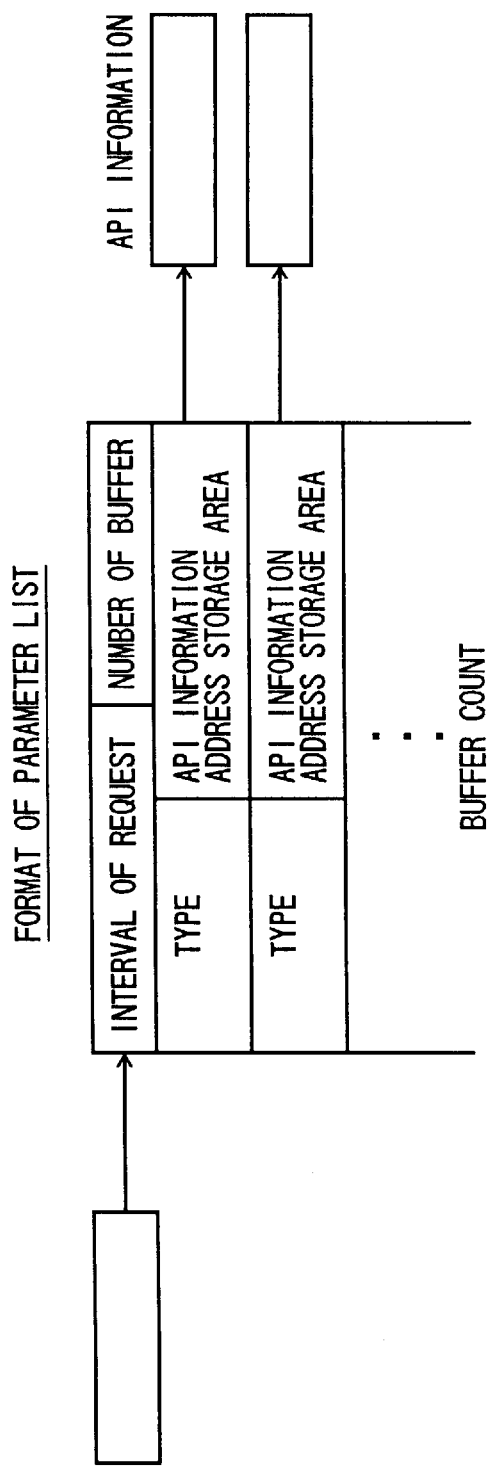
FIG. 10 is a view showing the configuration of a parameter list of a first embodiment according to the present invention.

The real-time API 14 performs interfacing between the system and the user machine, and also uses the parameter list 22 as the basis for storing data obtained from the I/O space controller 13, in the API information storage portion 23. FIG. 10 shows the configuration of the parameter list, while FIG. 11 shows the configuration of the API information storage portion 23. The parameter list 22 contains data for the request cycle, the number of buffers, the types of buffers, and the API information address regions for those buffers. The API information storage portion 23 contains the current buffer usage amount 231, the buffer capacity extent current value 232, the buffer capacity extent initial value 233, the expansion threshold value 234, the expansion current value 235, the expansion limit value 236, the expansion value 237, and the expansion cumulative value 238.

On the basis of the request cycle obtained from the parameter list 22, the I/O space controller 13 obtains the API information address of the API information storage portion 23 which stores the information for the buffer, and stores the data obtained from the I/O space controller 13.

The data collection/management portion 15 gives a request for data collection to the real-time API 14 and obtains information stored in the API information storage portion 23, and then successively stores the obtained data in the recording table 24. In addition, the data collection/management portion 15 transfers the data of the recording table 24 to the calculation portion 16 via the screen controller 18, in response to data requests from the calculation portion 16.

The calculation portion 16 uses a formula specified beforehand by the definition portion 17 and each of the data received from the data collection/management portion 15 to determine the reference value s and the buffer usage ratio.

For the case where the mode is for monitoring at the point where expansion starts, the reference value is calculated according to:

$$s1 = (c'-b)/c \tag{1}$$

where
    s1 reference value;

c' initial value for the extent of buffer capacity;

b expansion threshold;

c extent of buffer capacity;

In this mode where the start of expansion is monitored, it is assumed that detection will be by the giving of an alarm and so this mode is suitable for system operation when there is a high frequency of estimation of the extent of buffer capacity, and where it is not assumed that expansion will take place.

In addition, in the case where the mode is for monitoring the limit for expansion, the reference value is calculated according to:

$$s2=(c-b)/c \qquad (2)$$

where s2 reference value;

b expansion threshold;

c extent for buffer capacity;

In this mode, it is assumed that there will be system operation for as long as the extent of the buffer capacity allows it and so this mode is suitable for system operation where it assumed that there is a low frequency of estimating the extent of the buffer capacity and that expansion will take place.

Moreover, these formulae (1) and (2) are obtained from the definition portion 17 and the initial value c' for the buffer capacity, the expansion threshold value b, and the extent c of the buffer capacity are all data obtained from the recording table 24 via the screen controller 18. In addition, when the types of reference values selected by the definition portion 17 are user-defined values, those user-defined values are obtained from the definition portion 17 and used to determine the buffer usage ratio. The calculation portion 16 calculates the reference value from either formula (1), formula (2), or the user-defined value which is defined directly by the user from the input portion 21, and transfers the results of that calculation to the screen controller 18.

The definition portion 17 is provided with a function for defining the formula for calculation of the reference value s, and also for selecting the user of either one of the calculation formulae of the user-defined values.

The screen controller 18 is provided with functions which include the screen display of the buffer usage ratio and the reference value specified by the calculation portion 16, notification to the application, output to the console, and output to an external storage device.

The display portion 19 is controlled by the screen controller 18 and performs display of items such as the reference value and the buffer usage ratio.

The sound output portion 20 outputs a sound as an alarm when the buffer usage ratio exceeds the reference value.

The input portion 21 is used for the input of the reference value specified by the user and also for the selection and input of the formula which the calculation portion 16 uses.

The following is a description of the data collection/management portion 15.

Figure 12:
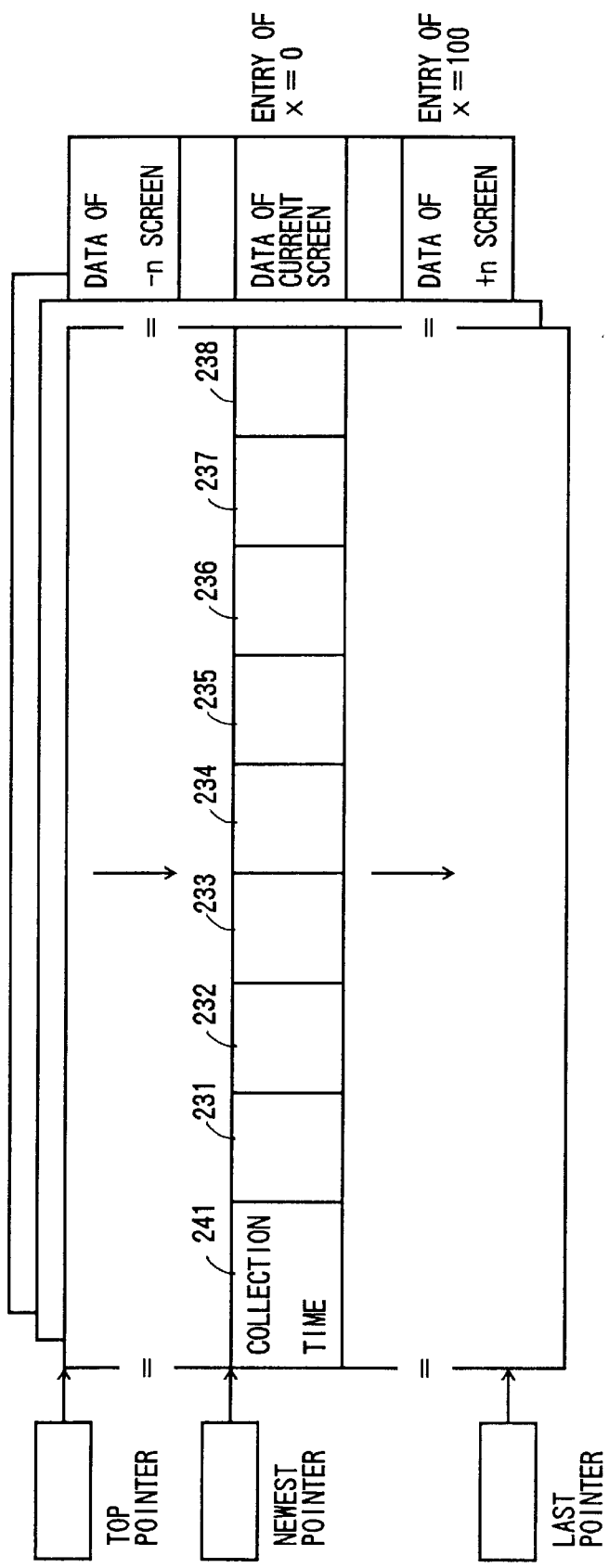
FIG. 12 is a view showing the configuration of a recording table of a first embodiment according to the present invention.

The data collection/management portion 15 successively stores the information which the API information storage portion 23 has obtained from the real-time API 14, in a time series in the recording table 24. FIG. 12 shows the configuration of the recording table. As shown in FIG. 12, the recording table 24 generates a time series as the collected data which corresponds to the screen "−n", the current screen and the screen "+n", so as to correspond to one type of buffer. This recording table 24 is several screens large, and there is cyclic storage from the head when it becomes full. For example, when there are 100 plots on one screen, and when a total of 8 screens can be displayed by performing scrolling up an down, the number of entries in the recording table 24 becomes 100 * 8=800 entries.

The calculation portion 16 uses data transferred from the data collection/management portion 15 and the results of selection by the definition portion 17 as the basis for determining the reference value and the buffer usage ratio, and transfers these to the display portion 19. By doing this, the results of the calculation are displayed on the screen of the display portion 19. Moreover, when a user-specified reference value has been specified, there is no calculation processing for the reference value.

In addition, the usage limit value for the data holding portion 12 is determined as the buffer usage amount which is the maximum value within the range where automatic expansion of the extent of buffer capacity can take place for a predetermined number of times, and for which the system will slow down if usage exceeding this takes place.

This usage limit value is sent to the side of the user machine via the realtime API and is displayed on the screen along with the buffer usage ratio and the reference value, so that the user can tell from the screen display what the critical usage value of the buffer 11 is.

In addition, the screen controller 18 also executes alarms for situations such as:

when automatic expansion of the extent of buffer capacity has taken place, when automatic expansion has taken place for the predetermined number of times, and when the buffer usage amount is approaching the usage limit value.

In addition, when a buzzer or some other alarm sound is given, the type of sound can be changed according to the particular phenomena for which the alarm is given, for example, an alarm sound A being given for when the first expansion takes place, an alarm sound B being given for when the next expansion takes place, a subsequent change back to the alarm sound A, and with this pattern repeating until the usage limit value is approached at the expansion limit value and alarm sound C is given.

The following is a description of the buffer monitoring operation in the configuration described above.

Figure 13:
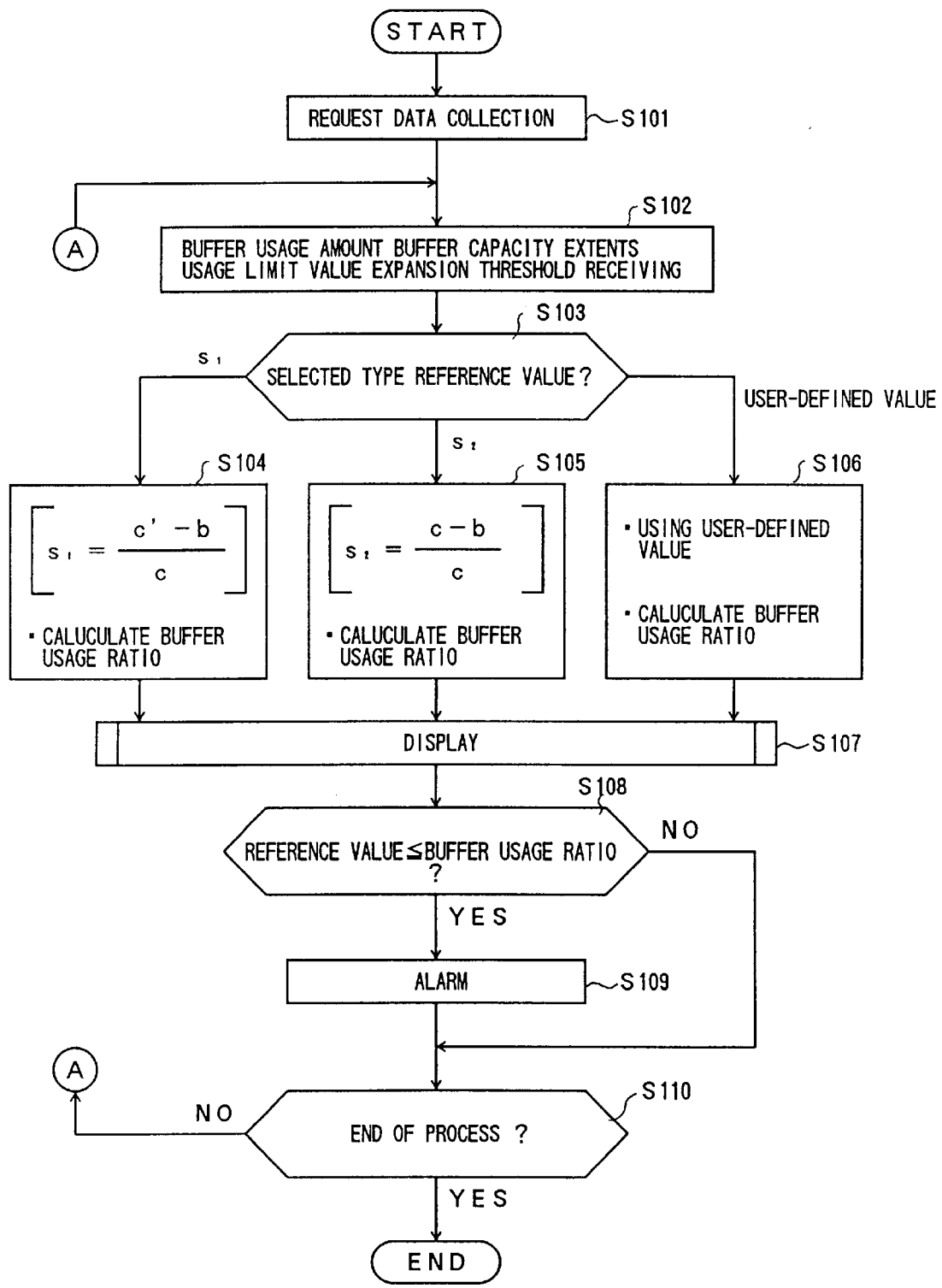
FIG. 13 shows the processing procedure for buffer monitoring in a first embodiment according to the present invention.

FIG. 13 shows the processing procedure for buffer monitoring in a first embodiment according to the present invention, and the following is a description thereof. Moreover, the following processing assumes that the operator will have made a judgment beforehand and will have specified expansion of the extent of the capacity of a certain buffer using the capacity extent expansion/contraction portion 10, and that the usage limit value and the expansion threshold value relation to that buffer are held in the data holding portion 12. In addition, the following description of the operation is for the case when the extent of the buffer capacity is expanded.

Step 101) First, the real-time API 14 uses the request cycle of the parameter list 22 to make a request to the I/O space controller 13 for information of the buffer at a particular time. Doing this causes the data obtained from the real-time API 14 via the I/O space controller 13 to be stored in the API information storage portion 23. Here, when there is the issue of a data collection request from the data collection/management ent portion 15 to the real-time API 14, the real-time API 14 uses the request from the data collection/management ent portion 15 to read the data from the API information storage portion 23 and transfer it to the data collection/management portion 15.

FIG. 11 shows the information which is transferred.

Step 102) The data collection/management portion 15 receives data such as the buffer usage amount, the buffer capacity extents c and c', the usage limit value and the expansion threshold value b from the API information storage portion 23 via the real-time API 14, and stores this in the recording table 24 as shown in FIG. 12.

Moreover, the data for the usage limit value and the threshold value can be received from the data holding portion 12 the first time.

Step 103) When the operator issues a request for a buffer monitoring screen, the screen controller 18 obtains from the recording table 24 the data necessary to calculate the reference value, judges the type of reference value selected by the definition portion 17 and then determines the reference value for the buffer. There is a transfer to step 104 when the type of calculation for the reference value uses formula (1), a transfer to step 105 when the type of calculation uses formula (2), and a transfer to step 106 when there are user-defined values.

Step 104) The calculation portion 16 substitutes the buffer capacity extent initial value c' for the buffer capacity extent c, and the expansion threshold value b into formula (1) and determines the reference value s1 and also the buffer usage ratio. It then transfer the results of the calculation to the screen controller 18 and passes the processing to step 107.

Step 105) The calculation portion 16 substitutes the buffer capacity extent c, and the expansion threshold value b into formula (2) and determines the reference value s2 and also the buffer usage ratio. It then transfer the results of the calculation to the screen controller 18 and passes the processing to step 107.

Step 106) The calculation portion 16 sets the user-defined value as the reference value and calculates the buffer usage ratio. It then transfers the results of that calculation to the screen controller 18 and passes the processing to step 107.

Step 107) The screen controller 18 and the display portion 19 use the reference value and the buffer usage ratio as the basis to write the screen display before passing processing to the next step.

Step 108) There is a determination for "reference value≦buffer usage ratio" and if the answer is "YES" processing is passed to the next step, or to step 110 if "NO".

Step 109) The alarm sounding processing is executed and processing is passed to the next step.

Step 110) There is a determination for whether or not the end of buffer monitoring processing has been specified and processing is passed to the next step if the answer is "YES" or to step 102 if the answer is "NO".

Figure 1:
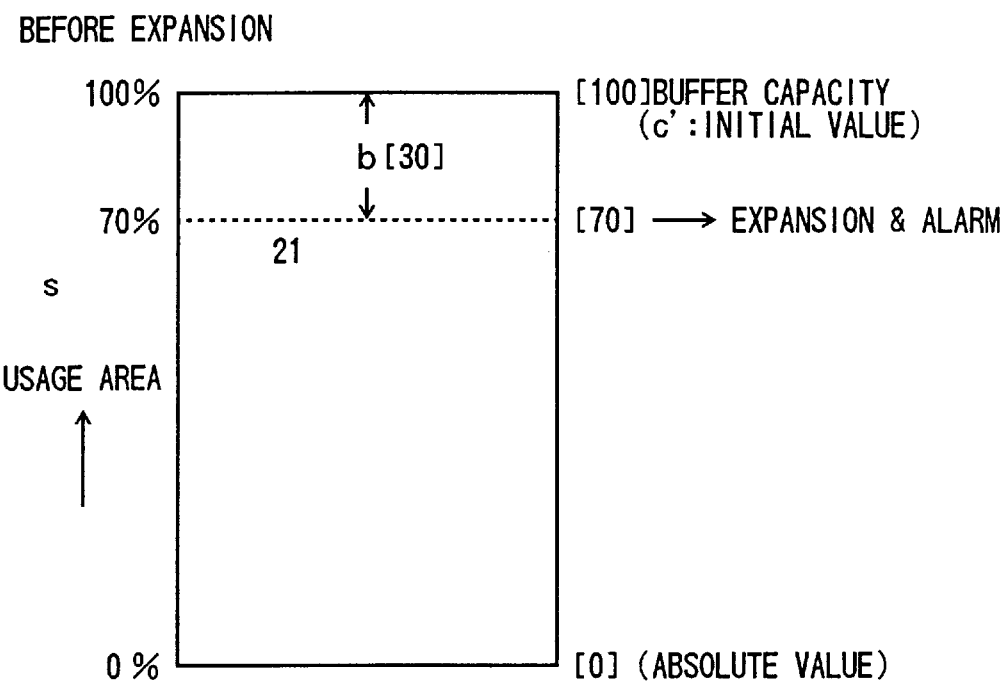
FIG. 1 is a view shown a conventional status prior to expansion of an extent of a buffer capacity.
Figure 2:
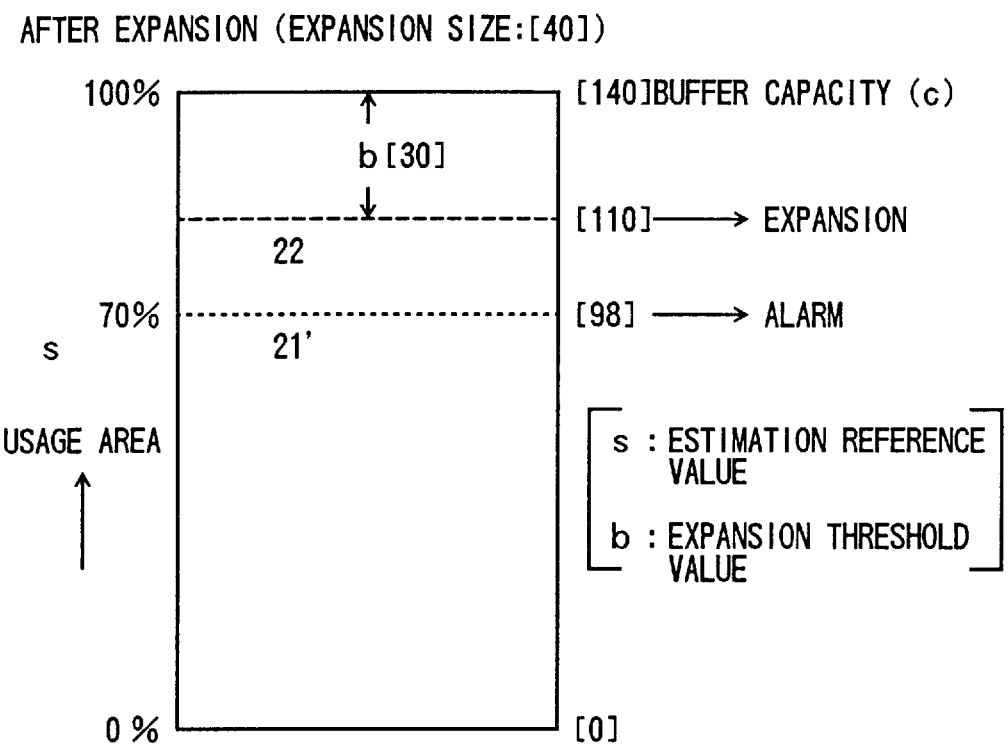
FIG. 2 is a view showing a conventional status after expansion of an extent of a buffer capacity.
Figure 3:
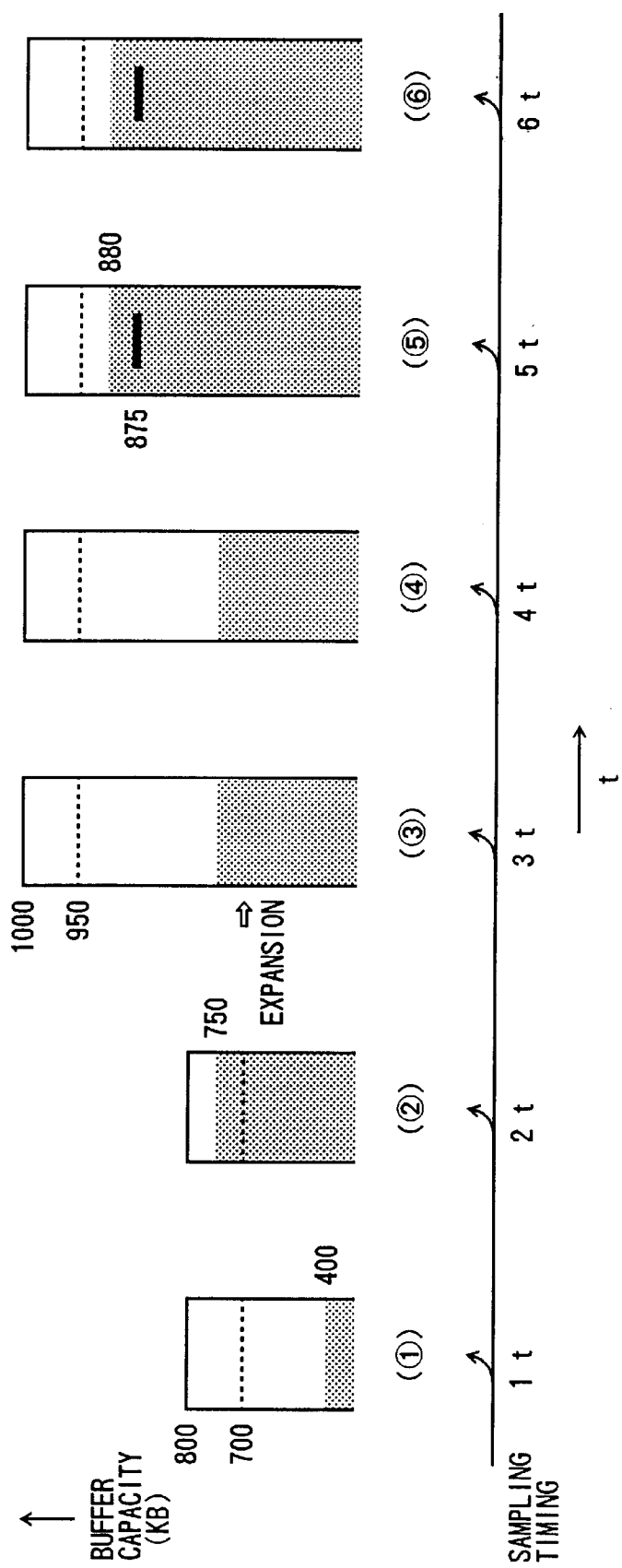
FIG. 3 is a view describing conventional buffer monitoring in terms of a time series.
Figure 4:
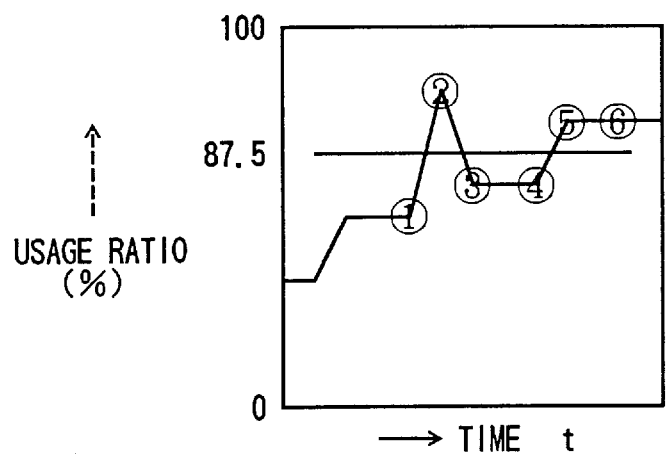
FIG. 4 is a graph showing the usage ratio of the example of FIG. 3.
Figure 5:
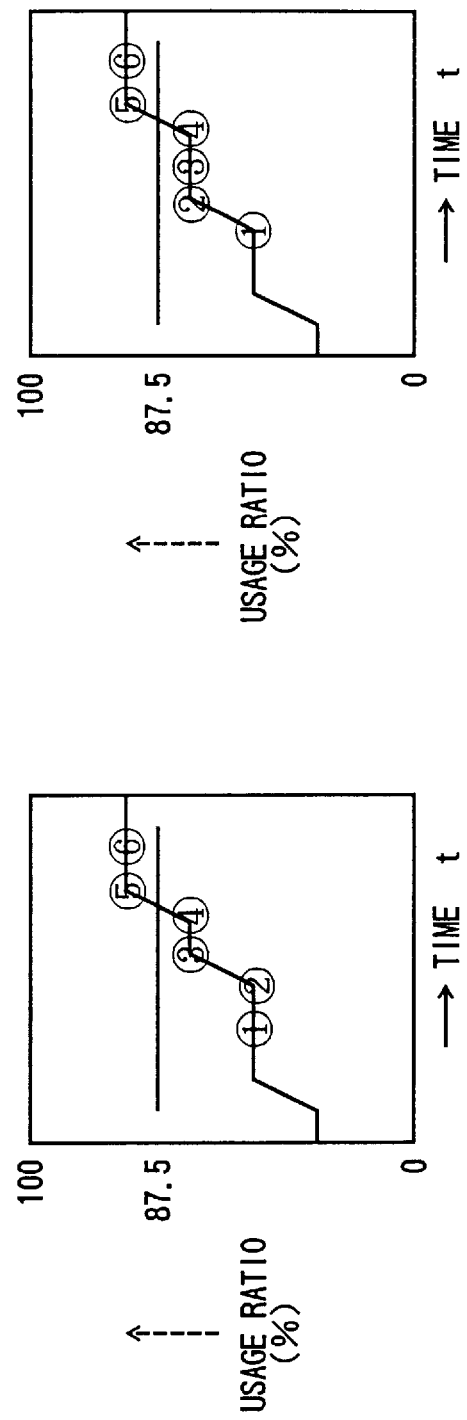
FIG. 5 is graph describing problems with the conventional art.
Figure 6:
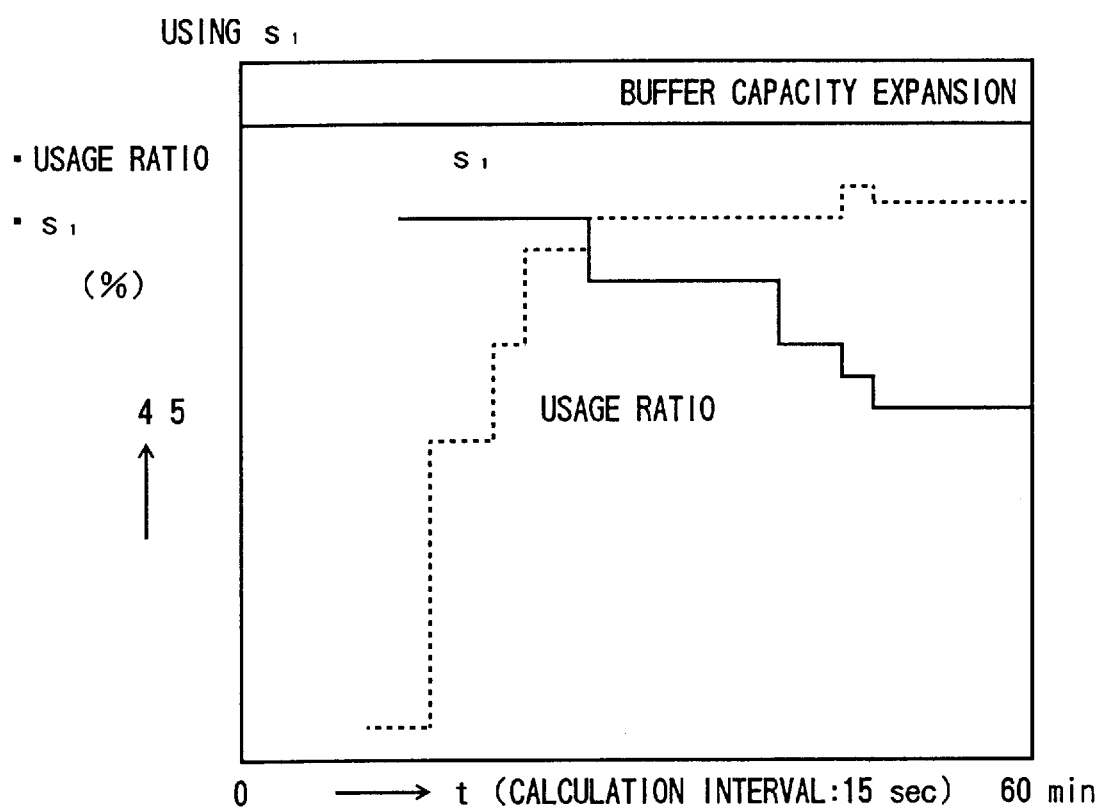
FIG. 6 is a view showing the relationship between the usage ratio and the reference value of the buffer according to the present invention (for the case when reference value s1 is used)
Figure 7:
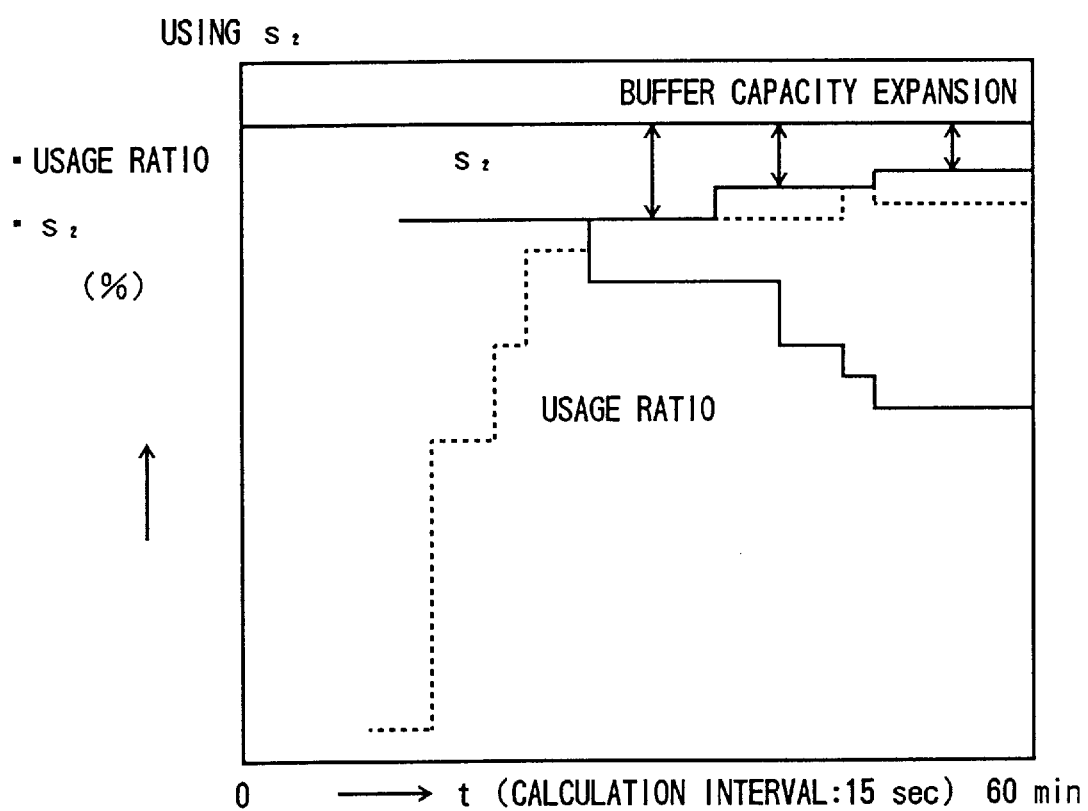
FIG. 7 is a view showing the relationship between the usage ratio and the reference value of the buffer according to the present invention (for the case when reference value s2 is used)

FIG. 6 and FIG. 7 show that in step 108, the a determination for "reference value≦buffer usage ratio" has:
in the case shown in FIG. 6 for where the reference value s1 is used, there is one expansion of the extent of the buffer capacity for when the line for the reference value intersects the line for the buffer usage ratio, and that in the case shown in FIG. 7 for where the reference value s2 is used, the buffer usage ratio is raised even further once expansion has taken place for the predetermined number of times and the reference value has exceeded the final value of 88%.

Figure 14:
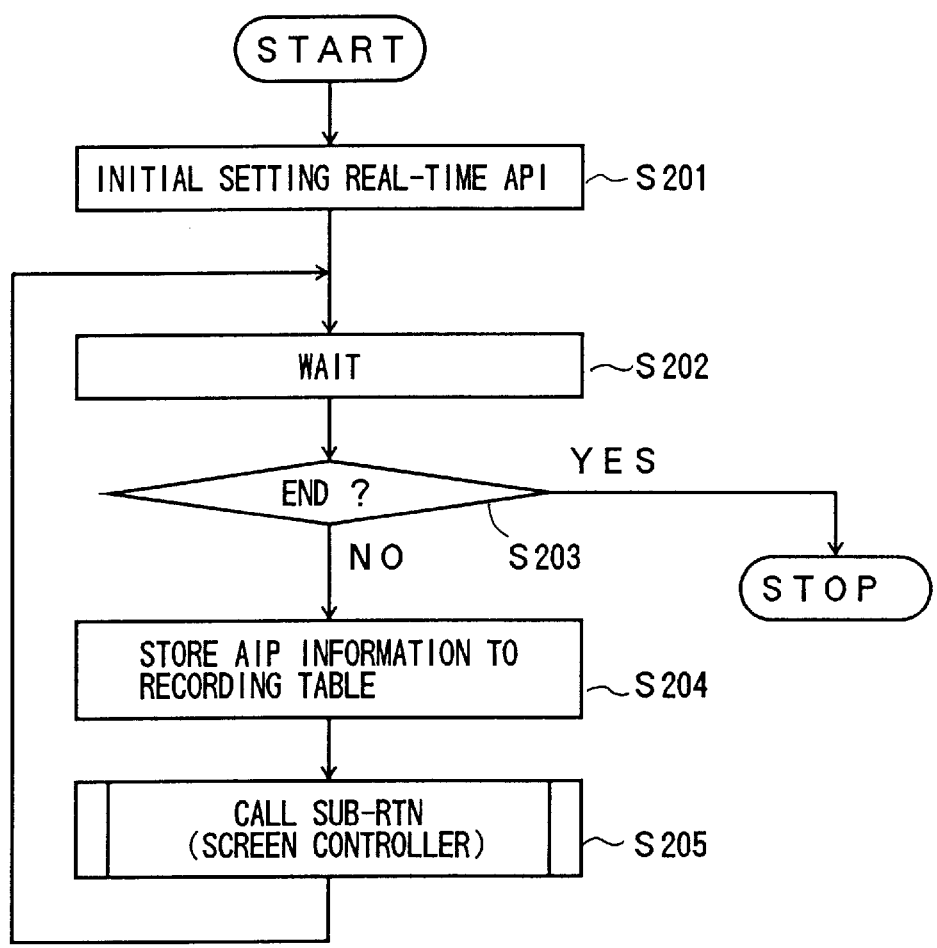
FIG. 14 is a flowchart of the operation of a data collection portion of a first embodiment according to the present invention.

FIG. 14 is a flowchart of the operation of the data collection/management portion 15 according to an embodiment of the present invention.

Step 201) The data collection/management portion 15 performs initial setting for the real-time API 14. These initial settings use the parameter list shown in FIG. 10, and notify the API of the request cycle, the number of buffers, the types of buffers and the API information address storage region.

Step 202) There is a standby for the arrival of the cyclic request from the real-time API 14. (This is a request after the address of the API information has been set in the API information address storage region.)

Step 203) The processing of the data collection/management portion 15 is ended if the operator specifies the end of buffer capacity expansion/contraction.

Step 204) The API information is stored in the recording table 24 if the operator has specified expansion or contraction of the buffer capacity.

Step 205) Processing is transferred to the screen controller 18, the change in the buffer capacity is displayed on the screen and processing is then transferred to step 202.

The following is a description of the operation of the screen controller 18.

Figure 15:
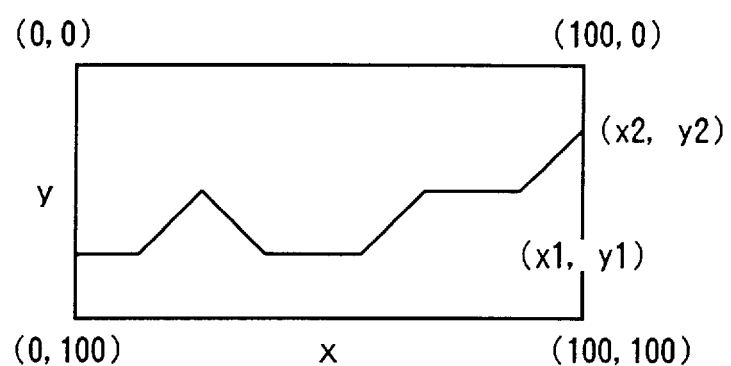
FIG. 15 shows one example of coordinate configuration of a screen controller of a first embodiment according to the present invention.

In the following description, for the sake of simplicity of description, it is assumed that there will be the display of one screen for one display apparatus, and that the one screen will have the coordinate configuration shown in FIG. 15. The coordinate configuration shown in FIG. 15 expresses one screen as coordinates (x, y) and joins lines (x1, y1)–(x2, y2).

Figure 16:
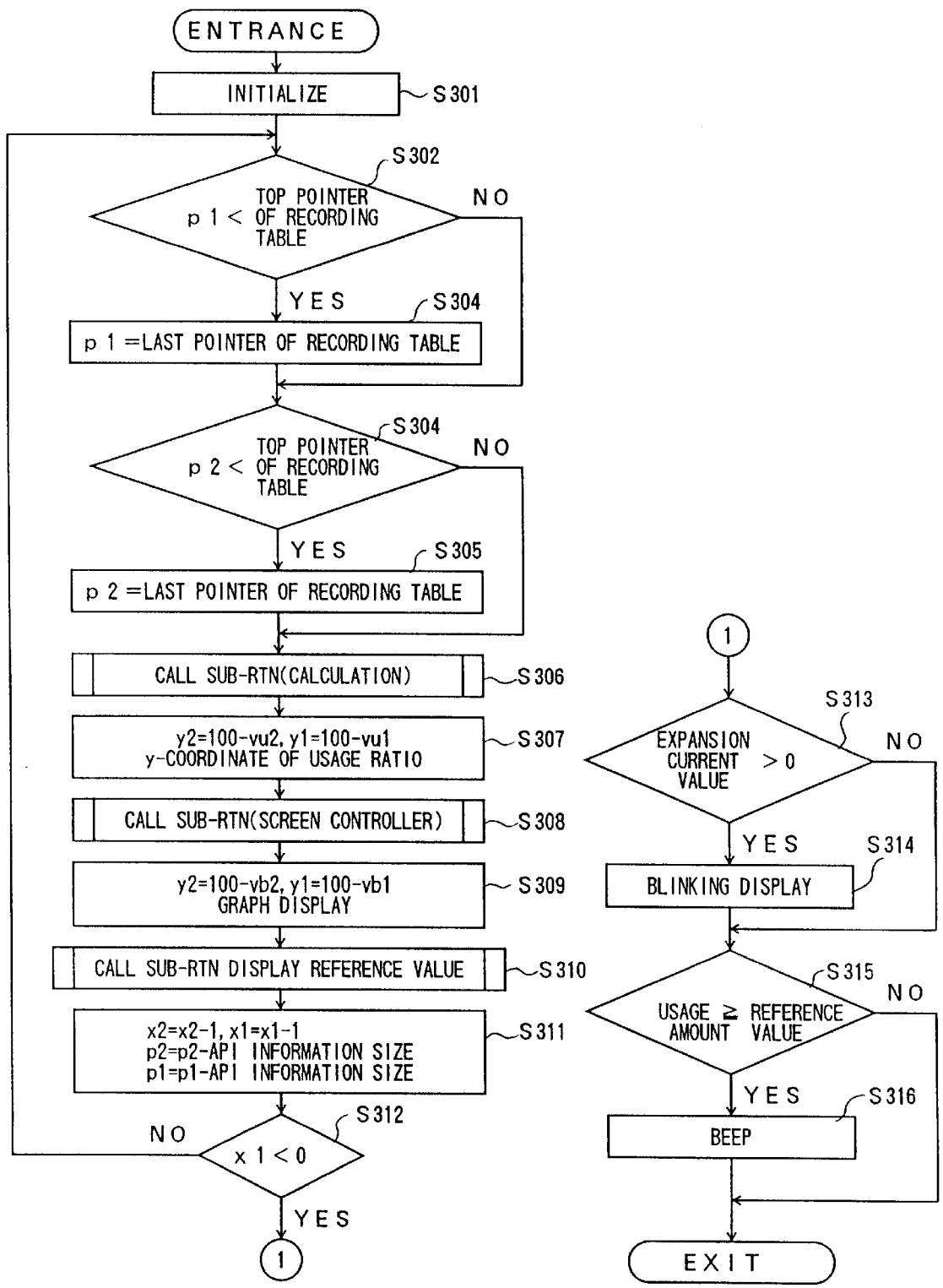
FIG. 16 is flowchart of the operation of a screen controller of a first embodiment according to the present invention.

FIG. 16 is flowchart showing the operation of the screen controller according to an embodiment according to the present invention.

Step 301) The screen controller 18 sets x2=100 and x=99 as initial values, p2 as the new pointer for the recording table, and p1 as p2–API information size (previous pointer for the information table).

Step 302) Processing is transferred to step 304 if the value for p1 is larger than the pointer for the head of the recording table 24. Processing is transferred to step 303 if the value for p1 is smaller than the pointer for the head of the recording table 24.

Step 303) p1 is made the final pointer for the recording table 24.

Step 304) Processing is transferred to step 306 if the value for p6 is larger than the pointer for the head of the recording table 24.

Step 305) p2 is set as the final pointer for the recording table 24.

Step 306) The processing of the calculation portion 16 is called.

Step 307) The y-coordinate for the usage ratio is determined by the usage ratio vu1 calculated according to the API information indicated by the previous pointer of the recording table 24 and the usage ratio vu2 calculated according to the API information indicated by the new pointer for the recording table 24.

$$y2=100-vu2, y1=100-vu1$$

Step 308) The processing of the display portion 19 is called, (x1, y1)–(x2, y2) are linked by a straight line and there is display processing for the usage ratio.

Step 309) The coordinate y2 is determined using the reference value vb1 calculated on the basis of the API information indicated by the previous pointer of the recording table 24 and the reference value vb2 calculated on the basis of the API information indicated by the new pointer for the recording table 24.

$$y2=100-vb2, y1=100-vb1$$

Step 310) The processing of the display portion 19 is called and the reference value is displayed.

Step 311) The results of the previous y1, x1 and the results of the new y2, x2 are obtained and the coordinates converted (by processing to line the two).

$x2=x2-1$, $x1=x1-1$ $p2=p2$-API information size $p1=p1$-API information size

Step 312) Processing is transferred to step 313 if the value of x1 is larger than 0, and to step 302 if not.

Step 313) Processing is transferred to step 314 if the expansion current value is larger than 0, and to step 315 if not.

Step 314) There is a colored blinking display red on the display portion 19 if expansion is taking place.

Step 315) The usage amount and the reference value are compared and processing is transferred to step 316 if the usage amount is larger than the reference value, and the processing of the screen controller ends if it is not.

The following is a description of the operation of the calculation portion 16.

Figure 17:
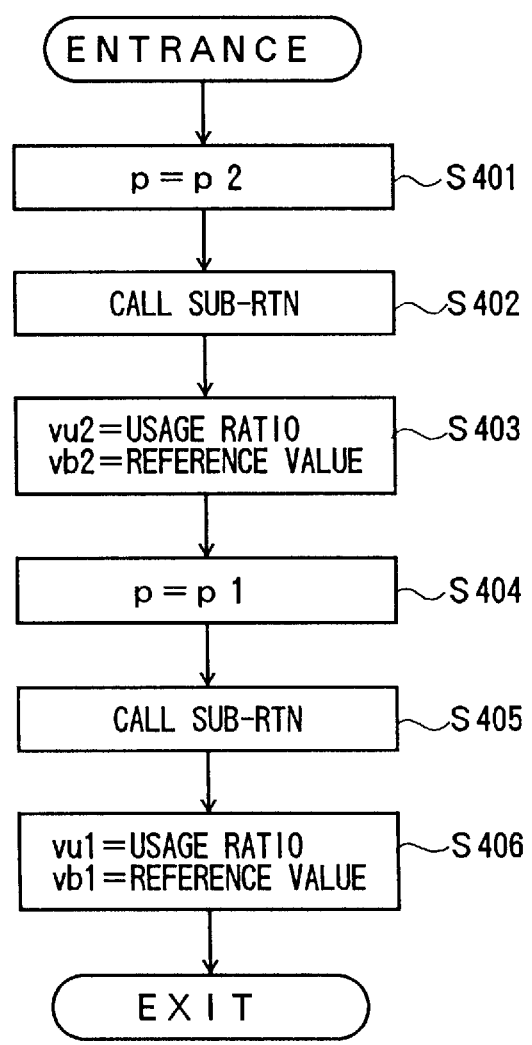
FIG. 17 is a flowchart of the operation of a calculation portion of a first embodiment according to the present invention.

FIG. 17 is a flowchart of the operation of the calculation portion of an embodiment according to the present invention.

Step 401) The calculation portion 16 receives the parameters for the previous pointer (p1) and the new pointer (p2) for the recording table 24 of the data collection/management portion 15. By doing this, the calculation portion 16 makes p=p2 as the pointer for referral of the recording table 153.

Figure 18:
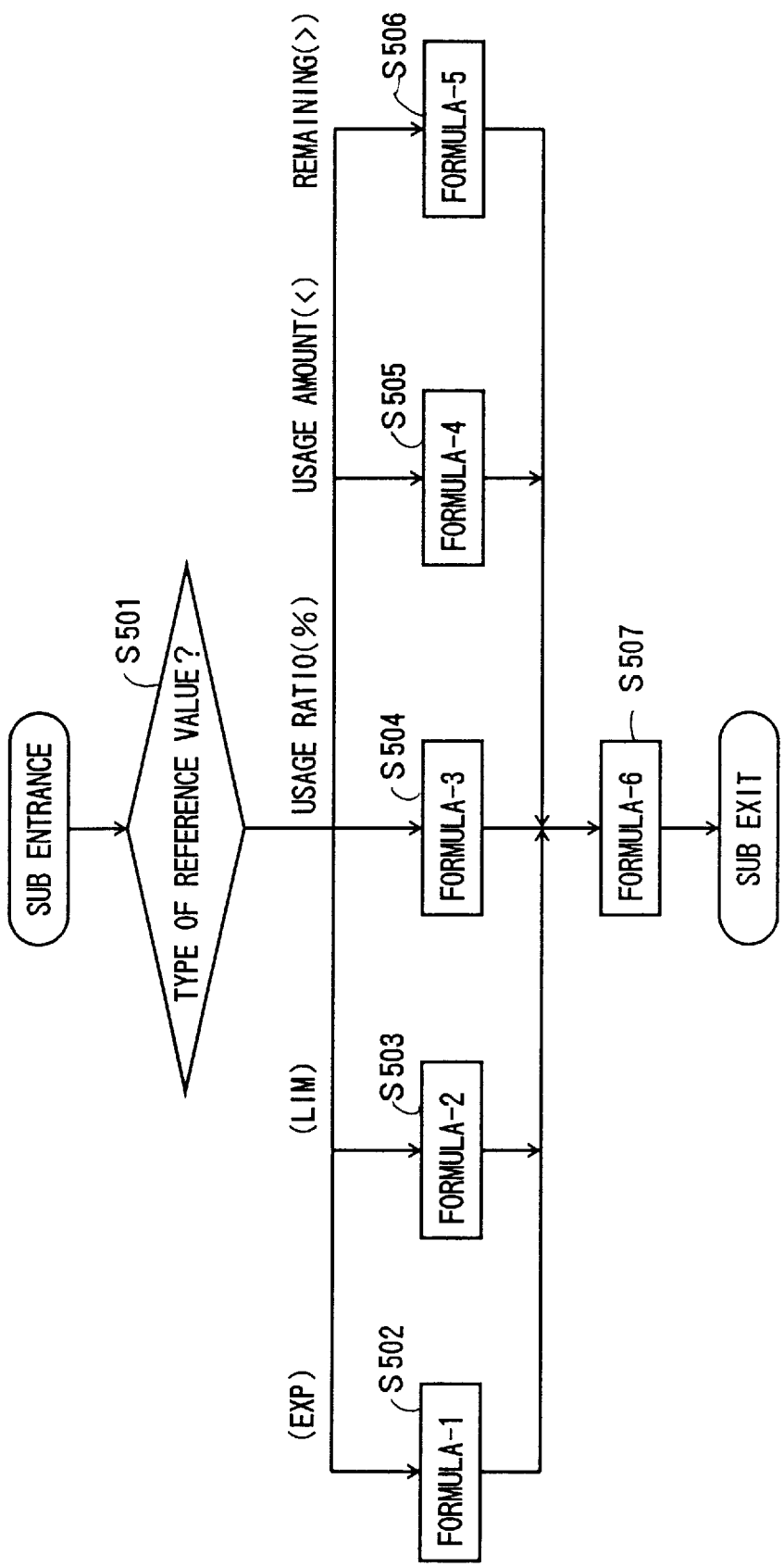
FIG. 18 is flowchart of a subroutine of a calculation portion of a first embodiment according to the present invention.

Step 402) There is a call-up of the subroutine for the calculation formula shown in FIG. 18.

Step 403) The usage ratio determined by step 402 is set as vu2 (vu2=usage ratio) and the reference value determined by step 402 is set as vb2 (vb2=reference value).

Step 404) The previous pointer for the recording table 24 is set as the pointer p (p=p1) for referral of the recording table 24.

Step 405) The subroutine for the calculation formula shown in FIG. 18 is called once again.

Step 406) The usage ratio determined by Step 405 is set as vu1 (vu1=usage ratio) and the reference value determined by step 405 is set as vb1 (vb1=reference value).

The following is a description of the subroutine for the calculation formula called by the calculation portion 16 in the steps 402 and 405 described above. FIG. 18 is a flowchart of the calculation processing of the calculation portion of an embodiment according to the present invention.

Step 501) The calculation portion 16 makes a determination as to the type of reference value.

1. The processing is transferred to step 502 when the reference value is s1 (i.e. when there is a mode for monitoring the start of expansion).
2. The processing is transferred to step 504 when the reference value is user specified and when the specified value is the usage ratio.
3. The processing is transferred to step 505 when the reference value is a user-specified value and is a usage amount.
4. The processing is transferred to step 506 when the reference value is a user-specified value and is an amount remaining.

Step 502) The processing is transferred to step 506 when the reference value in the calculation portion 16 is s1, and the following calculation has been performed.

FORMULA-1:

reference value = (buffer extent initial value − expansion threshold value)/buffer extent current value * 100(%)

Step 503) The processing is transferred to step 507 when the reference value in the calculation portion 16 is s2, and the following calculation has been performed.

FORMULA-2:

reference value = (buffer extent initial value − expansion threshold value)/buffer extent current value × 100(%)

Step 504) When the reference value in the calculation portion 16 is a user-specified value and that user-specified value is a usage ratio, the reference value is made equal to that specified value (%) and the processing is transferred to step 507.

FORMULA-3:

value=specified value

Step 505) When the reference value in the calculation portion 16 is a user-specified value and that user-specified value is a usage amount.

FORMULA-4:

reference value = specified value/buffer extent current value * 100(%)

and processing is transferred to step 507.

Step 506) When the reference value in the calculation portion 16 is a user-specified value and that user-specified value is an amount remaining.

FORMULA-5 reference value = (buffer extent current value − specified value)/buffer extent current value * 100(%)

and the processing is transferred to step 507.

Step 507) The calculation portion 16 uses the following formula to determine the usage ratio.

FORMULA-6 usage ratio=usage amount / buffer extent current value * 100 (%)

Figure 19:
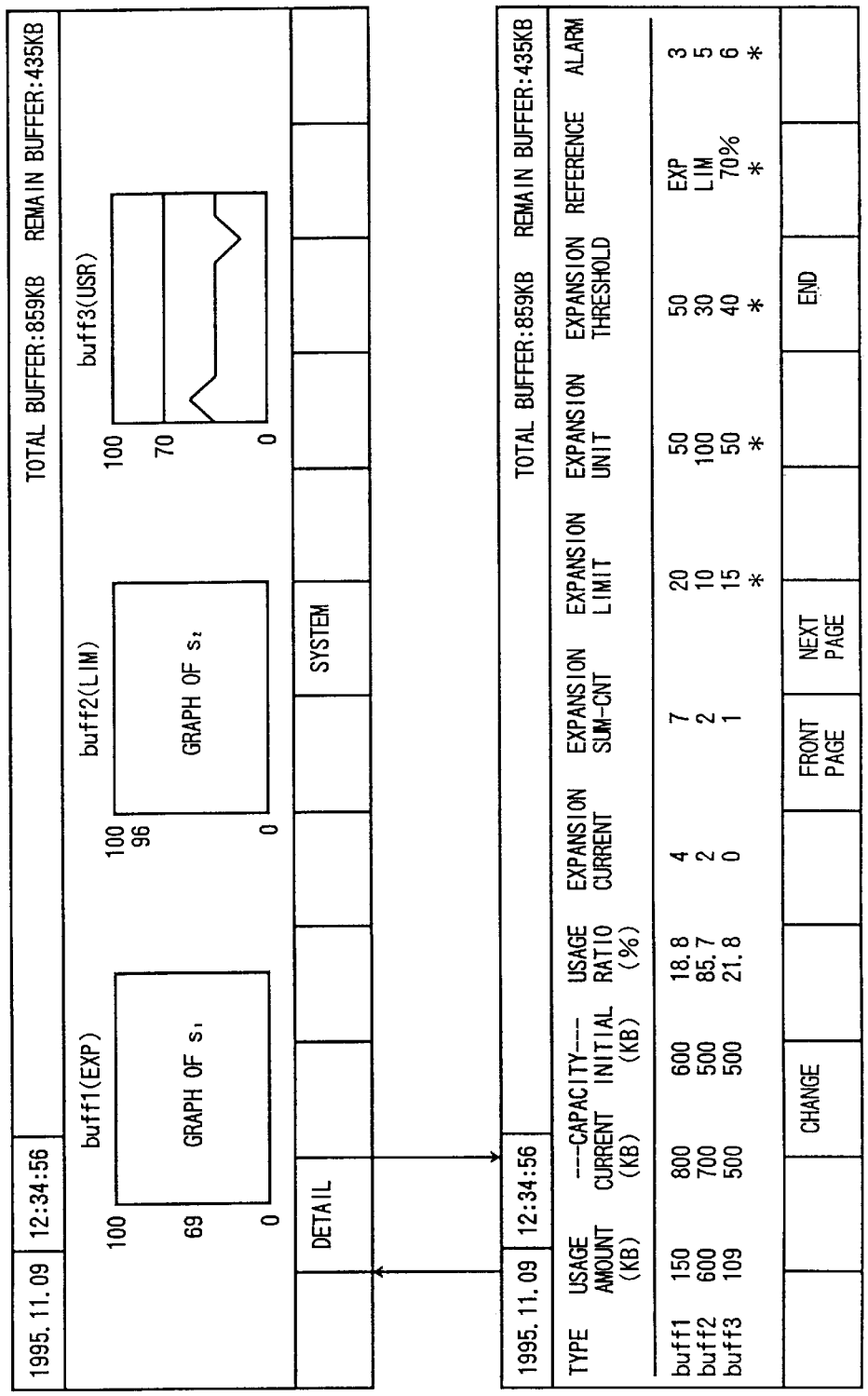
FIG. 19 shows an example of a display pattern of a first embodiment according to the present invention.

The following is a description of the contents displayed on the display portion 19, with reference to FIG. 19.

In FIG. 19, there is display of two pattern screens with the upper screen displaying in graph format, and the lower screen displaying numerical values as detailed data.

In the upper screen, buff1 is the mode which monitors the starting point of expansion, and is a graph based on the reference value s2 determined by $s2=(c-b)/c$, with the reference value being 98 when the current expansion occurs.

[buff 3] is the mode which monitors a user-specified value, and the specified value is for a single symbol.

"%" specifies monitoring by usage ratio

"<" specifies monitoring by usage amount

">" specifies monitoring by threshold value

In addition, if the reference value is exceeded while expansion is taking place, the sound output portion 20 outputs a buzzer sound for a predetermined time.

When there is to be confirmation of detailed data from the screen displaying the graph, the "DETAIL" button on the status screen is clicked and there is a display of the detailed data screen shown in the lower portion of FIG. 19.

For each of the buffers, the lower screen displays the usage amount (KB), the buffer extent (current/initial )(KB), The usage ratio (%), the number of buffer of current expansion, the cumulative count for the number of expanded buffers, the number of expansion limit (times), the expansion units (KB), the expansion threshold value (KB), the reference value, and the method of alarm.

In the example for buff1 shown in FIG. 19, there is the calculation of the following items:

usage amount=150 usage ratio 18.8 =

150(usage amount)/800(buffer extent current value) * 100, number of current expansion 4 (extent current value 800−extent initial value 600) / expansion units 50 and the number of expansions possible becomes (extent initial value 600+ expansion units 50) * 20=1600 KB which is the maximum extent for the buffer capacity. The cumulative count for the number of expansions becomes four since a total of seven expansions have occurred but the equivalent of four buffers (50 * 4=200 KB) has been expanded by that time. The expansion units are the amount (in KB) per expansion. The amount remaining for the buffer extent is not displayed in the example shown in FIG. 19 but can be found by calculating buffer extent (current )−usage amount.

When the "CHANGE" marker on the screen in the lower portion of FIG. 19 is clicked, the background color of the screen changes to the input mode, and moving the cursor to the "*" portion and clicking there enables direct input and change. Clicking on the "END" button after changing returns to the realtime monitor and the system.

In this manner, the present invention uses a display screen for a reference value based on a value calculated from a buffer capacity extent for each arbitrary point of time and not a fixed value as in the conventional case. This enables the display of the reference value to always be in agreement with expansion of the extent of a buffer capacity.

Because of this, it is possible for a system operator or user to know a correct reference value linked to how the extent of the buffer capacity changes, and the situation for use of the buffer to be correctly monitored, system reliability enhanced, and efficient operation performed.

Moreover, the present invention is not limited to the embodiment described above, as other modifications, changes and applications are possible within the scope of the present invention as disclosed in the appended claims.

What is claimed is:

1. A buffer capacity change monitoring method for monitoring change in buffer capacity extent of a variable buffer, having a usable region, when the usable region has been reduced to an expansion threshold value, comprising:

calculating a reference value corresponding to said buffer capacity extent at arbitrary points in time, using the expansion threshold value and buffer capacity extent at each of said arbitrary points in time; and displaying change of said buffer capacity extent according to said reference value, synchronized with a generation of change of said buffer capacity extent and a change occurring in buffer capacity extent of the display.

2. The buffer capacity change monitoring method as claimed in claim 1, wherein said calculating of said reference value uses a first calculation formula:

$$s1=(c'-b)/c,$$

wherein s1=reference value, c'=initial value of extent of buffer capacity, b=expansion threshold value, and c=extent of buffer capacity for determining said reference value.

3. The buffer capacity change monitoring method as claimed in claim 1, wherein said calculating of said reference value uses a second calculation formula:

$$s2=(c-b)/c,$$

wherein s2=reference value, b=expansion threshold value, and c=extent of buffer capacity for determining said reference value.

4. The buffer capacity change monitoring method as claimed in claim 2, said calculating of said reference value further comprising selecting a calculation formula.

5. The buffer capacity change monitoring method as claimed in claim 3, calculating of said reference value further comprising selecting a calculation formula when said reference value is calculated.

6. A buffer capacity change monitoring apparatus for monitoring change in buffer capacity extent of a variable capacity buffer having a usable region, when the usable region has been reduced to a required threshold value for expansion, comprising:

a reference value calculation means to calculate, using said threshold value and buffer capacity extent at an arbitrary point in time, a reference value which corresponds to said buffer capacity extent at said arbitrary point in time; and a display means for displaying change of said buffer capacity extent according to said reference value calculated by said reference value calculation means;

a usage ratio calculation means for determining a current usage ratio as current buffer usage amount / buffer capacity extent * 100;

a current expandable amount calculation means for determining and displaying a current amount of possible buffer expansion as initial buffer capacity extent times a required expansion unit times a number of expansions possible;

a cumulative expansion amount calculation means for determining a cumulative expansion amount by multiplying a required expansion unit by a cumulative number for the number of expansions; and a numerical value display means for displaying a type and value of said reference value determined by said reference value calculation means, and displaying a value determined by said calculation means for each buffer.

7. A buffer capacity change monitoring apparatus for monitoring change in buffer capacity extent of a variable capacity buffer having a usable region, when the usable region has been reduced to a required threshold value for expansion, comprising:
- a reference value calculation means to calculate, using said threshold value and buffer capacity extent at an arbitrary point in time, a reference value which corresponds to said buffer capacity extent at said arbitrary point in time; and
- a display means for displaying change of said buffer capacity extent according to said reference value calculated by said reference value calculation means.

8. The buffer capacity change monitoring apparatus claimed in claim 7, wherein said reference value calculation means calculates a first formula:

$$s1=(c'-b)/c,$$

wherein
- s1=reference value,
- c'=initial value of extent of buffer capacity,
- b=expansion threshold value, and
- c=extent of buffer capacity for determining said reference value.

9. The buffer capacity change monitoring apparatus claimed in claim 7, wherein said reference value calculation means calculates a second formula:

$$s2=(c-b)/c,$$

wherein
- s2=reference value,
- b=expansion threshold value, and
- c=extent of buffer capacity for determining said reference value.

10. The buffer capacity change monitoring apparatus claimed in claim 9, further comprising:
- a first formula s1=(c'−b)/c, where s1=reference value,
- c'=initial value of extent of buffer capacity,
- b=expansion threshold value,
- c=extent of buffer capacity for determining said reference value;
- a user specifying means for user specification of said reference value using a buffer usage ratio, a buffer usage amount, and said threshold value; and
- a selection means for selecting said first formula, said second formula or said reference value selected by said user specifying means.

11. The buffer capacity change monitoring apparatus claimed in claim 7, wherein said display means is a graphical display of a time series of said buffer capacity extent.

12. The buffer capacity change monitoring apparatus claimed in claim 11, said reference value calculation means further comprising:
- a first formula, s1=(c'−b)/c, and a second formula s2=(c−b)/c, where s1 and s2=reference value,
- c'=initial value of extent of buffer capacity,
- b=expansion threshold value,
- c=extent of buffer capacity for determining said reference value;
- a user specifying means for user specification of said reference value using a buffer usage ratio, a buffer usage amount, and said threshold value; and
- a selection means for selecting one of said first formula, said second formula or said reference value selected by said user specifying means.

13. The buffer capacity change monitoring apparatus claimed in claim 7, wherein said reference value calculation means further comprises a user specifying means for user specification of said reference value using a buffer usage ratio, a buffer usage amount, and said threshold value.

14. The buffer capacity change monitoring apparatus claimed in claim 13, further comprising:
- a first formula, s1 =(c'−b)/c, and a second formula s2= (c−b)/c, where s1 and s2=reference value,
- c'=initial value of extent of buffer capacity,
- b=expansion threshold value,
- c=extend of buffer capacity for determining said reference value; and
- a selection means for selecting one of said first formula, said second formula or said reference value selected by said user specifying means.

15. The buffer capacity change monitoring apparatus claimed in claim 7, further comprising:
- a first formula, s1=(c'−b)/c, and a second formula, s2= (c−b)/c, where s1 and s2=reference values;
- c'=initial value of extent of buffer capacity,
- b=expansion threshold value,
- c=extent of buffer capacity for determining said reference value;
- a user specifying means for user specification of said reference value using a buffer usage ratio, a buffer usage amount, and said threshold value; and
- a selection means for selecting said first formula, said second formula or said reference value selected by said user specifying means.

16. The buffer capacity change monitoring apparatus claimed in claim 7, further comprising a first alarm means for outputting a buzzer sound for a fixed period of time when buffer expansion takes place and said reference value is exceeded.

17. The buffer capacity change monitoring apparatus claimed in claim 7, further comprising a second alarm means for outputting a buzzer sound for a fixed period of time when there has been a buffer expansion request which would exceed a required buffer capacity.

18. The buffer capacity change monitoring apparatus claimed in claim 7, wherein said display means further comprises a first display screen which changes colors when buffer expansion takes place and said reference value is exceeded.

19. The buffer capacity change monitoring apparatus claimed in claim 7, wherein said display means further comprises a second display screen which changes colors when buffer expansion takes place and said reference value is exceeded.

20. The buffer capacity change monitoring apparatus claimed in claim 7, wherein said display means displays at least one buffer.

21. The buffer capacity change monitoring apparatus claimed in claim 8, further comprising:
- a second formula s2=(c−b)/c, where s2=reference value,
- b=expansion threshold value,
- c=extent of buffer capacity for determining said reference value;
- a user specifying means for user specification of said reference value using a buffer usage ratio, a buffer usage amount, and said threshold value; and
- a selection means for selecting said first formula, said second formula or said reference value selected by said user specifying means.

* * * * *